(No Model.) 2 Sheets—Sheet 1.

C. W. WEISS & C. KRUSE.
ADDING DEVICE FOR CHECK MACHINES.

No. 329,421. Patented Oct. 27, 1885.

(No Model.) 2 Sheets—Sheet 2.

C. W. WEISS & C. KRUSE.
ADDING DEVICE FOR CHECK MACHINES.

No. 329,421. Patented Oct. 27, 1885.

Attest:
E. C. Perkins.
G. H. Spencer Jr.

Inventors:
Charles W. Weiss
Charles Kruse
By David A. Burr
Atty.

UNITED STATES PATENT OFFICE.

CHARLES W. WEISS, OF BROOKLYN, AND CHARLES KRUSE, OF NEW YORK, N. Y.

ADDING DEVICE FOR CHECK-MACHINES.

SPECIFICATION forming part of Letters Patent No. 329,421, dated October 27, 1885.

Application filed July 28, 1884. Serial No. 138,959. (No model.)

*To all whom it may concern:*

Be it known that we, CHARLES W. WEISS, of the city of Brooklyn, New York, and CHARLES KRUSE, of the city and State of New York, have invented a new and useful Improvement in Adding Devices for Check-Machines and other Purposes; and we do hereby declare that the following is a full and exact description thereof, reference being had to the accompanying drawings, and to the letters of reference marked thereon, making a part of this specification.

Our invention relates to mechanism for adding and indicating the sum of any succession of numbers selected and in order designated by means of a mechanical indicating device.

It consists in mechanism, as hereinafter described, whereby the device by which any particular number is selected from a given series is made to adjust or bring into service a stop whose position bears the same relation to a common initial plane or center as the number selected from the series bears to the abstract unit of said series, said contact-point operating when thus brought into play to limit the movement of an adding-machine, so that the number added by the machine to the sum already indicated thereby shall correspond to the number selected, the extent of the movement of the adding mechanism at each operation being exactly proportional to the distance of the contact-point from its initial plane or center, and consequently to the difference between the number selected and the initial or abstract unit of that number.

The object of our invention is to provide simply and effectively for the addition by any form of adding-machine to the total sum already registered thereby of any given number selected by means of a separate indicating device—as, for example, the denomination of a check printed or issued from a check-machine, the denominating number having been brought into register for printing by the movement of the indicator, so that the sum of the denominations of all checks so produced or issued shall be accurately registered.

Figure 1:
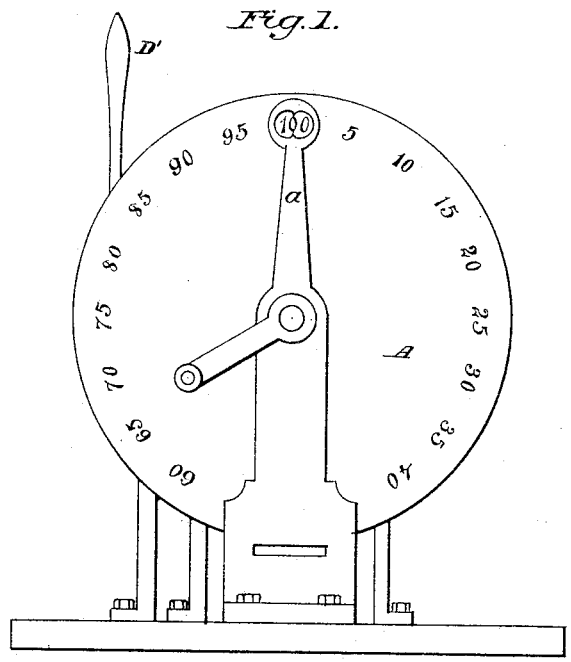
Figure 2:
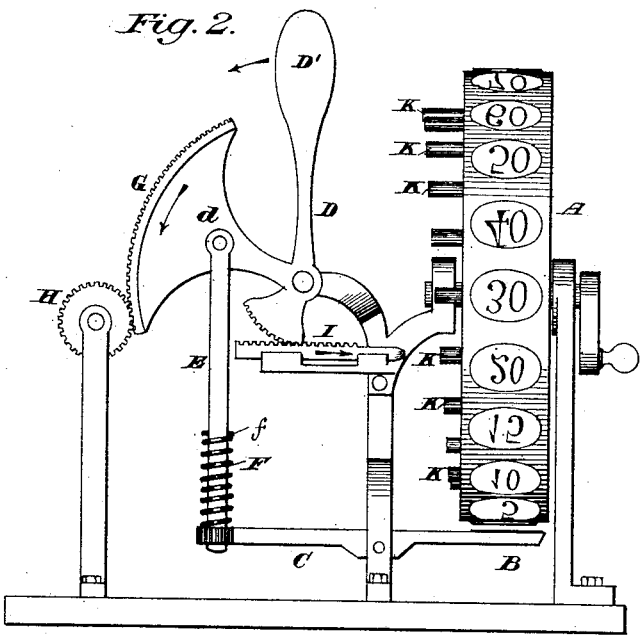
Figure 3:
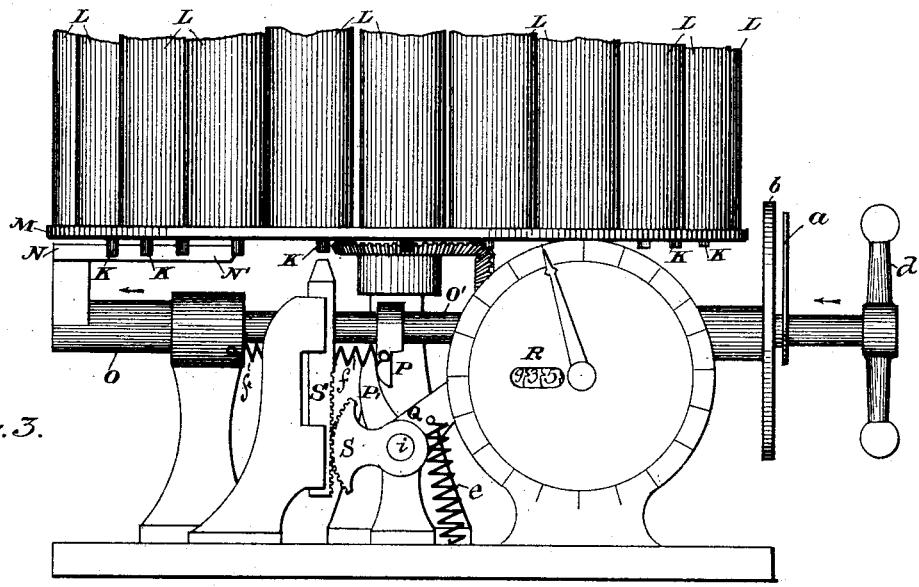
Figure 4:
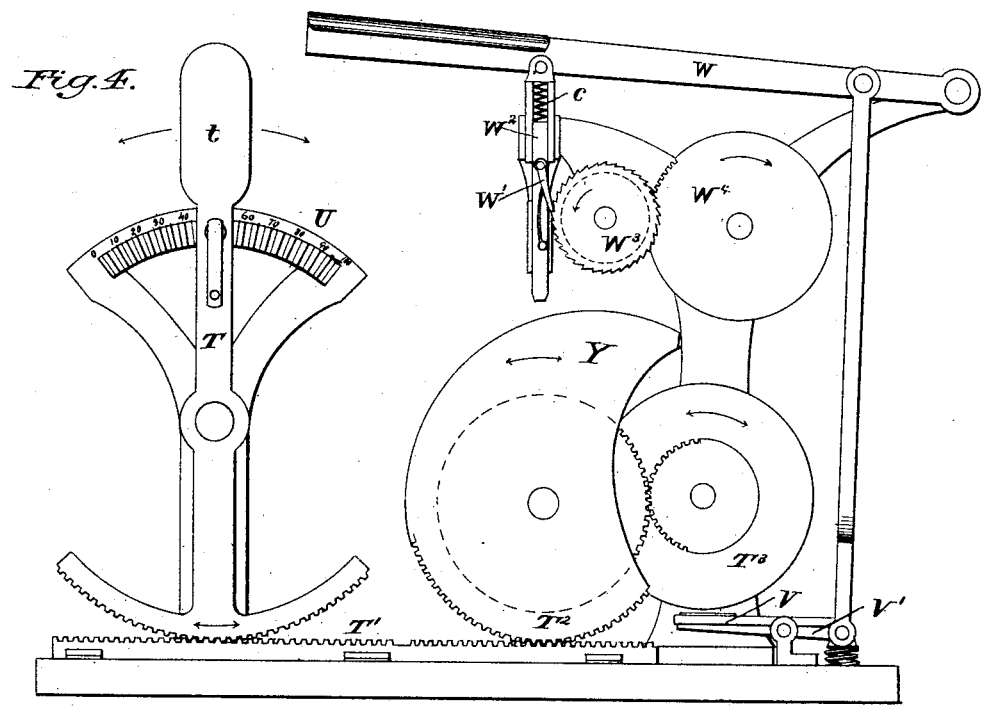

In the accompanying drawings, Figure 1 is a front elevation of a simple form of check-printing machine with our invention applied thereto in connection with a rotating type-wheel fitted with the proportional contact-points. Fig. 2 is a side elevation thereof, the adding wheels or device not being shown. Fig. 3 is a side elevation of a check delivering or distributing machine with our improvement applied thereto, in connection with the slide by which the checks are released for delivery, and Fig. 4 illustrates a modification of our invention in connection with a check-printing device in which the type-wheel is set and the proportional contact-points adjusted by means of a swinging lever.

A, Figs. 1 and 2, represents a type-wheel carrying upon its periphery a series of type adapted for printing the numerals to indicate the denominations, respectively, of a series of checks. A series of numbers corresponding with the denominations of the respective types are arranged in the same order upon the face of the wheel in such manner as that the number corresponding to any one of the types shall be in register with an indicator, a, when the corresponding type is in register with an impression-plate or platen, B. This platen B is adapted to move against the type brought into register therewith and imprint the paper led between the two. The movement of the platen B is produced by means of a lever, C, carrying the platen on its outer end, its inner end being actuated by the outer arm, d, of a bent lever, D, to which it is coupled by a pivoted rod, E. This rod E passes freely through an aperture in the end of the platen-lever C, but is made to actuate the lever by means of a spiral spring, F, encircling the rod and interposed between the lever and a pin, f, in the rod. The outer arm, d, of the bent lever D terminates in a segment-rack, G, adapted to engage the master wheel or pinion H of an adding-machine, which may be of any approved construction, and which it is not necessary herein to describe, and whose first wheel, indicating the units, is caused to make one complete revolution at each complete sweep or reciprocation of said segment-rack. The lever D is fitted with a handle, D', to facilitate its oscillation, and is pivoted to a suitable standard so as to vibrate in a plane at right angles to the inner face of the type-wheel A.

A bar, I, is mounted in suitable bearings to slide freely back and forth to and from the face of the wheel A, near to its outer rim, at a right angle thereto, and this sliding bar is geared to the lever D, either by means of a segment-rack on a projecting arm of the lever adapted to engage teeth on the bar, as illustrated in the drawings, Fig. 2, or by any other suitable mechanical device by which the oscillation of the lever shall produce a reciprocation of the bar. The length of the sliding reciprocating bar I and its position with relation to its actuating-lever D are so proportioned as that when the lever is moved so as to produce one complete revolution of the first or unit wheel of the adding device the reciprocating bar is brought into contact with the face of the wheel A or with a projection therefrom or a depression therein at the moment said revolution is completed. The wheel A is so adjusted with reference to the series of dies or type upon its periphery and to the corresponding indicating-numbers upon its face, and also with reference to this particular contact of the sliding bar I therewith, (which may be designated as the initial point,) as that at the moment of this contact the indicator shall denote the highest number in the series—for example, 9—and the corresponding die or type shall be brought over the platen into position for printing the check. At the point upon the face of the wheel at which the sliding bar I will strike it when the next lower number in the series—for example, 8—is brought into register with the indicator, and its corresponding type in position for printing, the surface of the wheel is made to so far depart from a plane passing through the initial point at right angles with the axis of the wheel and with the line of movement of the sliding bar as that the bar shall be arrested in its movement at the moment when the unit-wheel of the adding device shall have been carried by the lever D far enough to register a number corresponding to the said next lower number, 8, in the series. As the further movement of the lever D, and consequently of the adding device, is prevented by the contact of the bar I with the wheel A at this point, the adding device cannot be made to register any higher number, and the registry of this particular number is positively assured if the lever D be moved until stopped by the bar H. The face of the wheel A is provided with a series of these stops or special contact-points corresponding in number with the series of numbers of the indicator and of the dies by which the checks are to be printed, each stop being removed from the common initial plane to a degree which shall bear the same relation to said plane as the corresponding number noted by the indicator and which is to be impressed on the check bears to the highest number of the series or conversely to its initial number. The stops may be in the form of pins K K, as illustrated in Figs. 2 and 3, or be produced by elevations or depressions on the surface or in the body of the wheel either separate each from the other, as are the pins K K, or connected in the form of an inclined or cam surface.

Instead of interposing a sliding bar I between the lever D and the stops on the face of the wheel, we contemplate causing a projection from the lever itself to strike said stops, also other equivalent devices for arresting the movement of the lever by means of a contact produced with the face of the wheel or of stops or special contact-points thereon.

In the drawings, Fig. 3, our invention is illustrated as applied to a check-machine in which the checks, instead of being printed upon slips of paper, are delivered as required from a series of receptacles, L L L, each containing a number of checks of a given denomination. These receptacles are arranged upon a horizontal wheel, M, and their lower ends are closed by means of a stationary annular plate, (not shown,) over which they revolve. This plate is cut away at a given point, and a slide or strip of a thickness but slightly greater than that of a check is made to slide transversely in the opening over a bottom plate, N, forming a way therefor. An opening is formed in the strip of a diameter slightly greater than a check, so that when brought in register with a check the latter will drop therein, and as the strip is drawn out from under the receptacle it will bring the check with it. The opening in the slide-strip is made thus to slide out from under the receptacle far enough to allow the check to drop through an opening in the underlying plate N. This reciprocating movement of the strip is produced by its attachment to a reciprocating rod, O, which is coupled to a shaft, O', so mounted in suitable bearings as to admit of both a rotary and a reciprocating movement. The outer end of this rotating and longitudinally-reciprocating shaft O' is fitted with an index-pointer, $a$, adapted to more over a dial, $b$, whose numbers correspond to the denominations of the checks in the receptacles L L L. The wheel M is geared to the shaft O, so that the rotation of the latter shall cause a rotation of the wheel whereby each receptacle may be brought into register with the slide. The receptacles are so arranged with reference to the dial as that when the indicator-hand points to any given denomination noted upon the dial the receptacle containing the checks of that denomination is brought into register with the check-slide N. The sliding rod S', Fig. 3, is depressed by the downward movement of the segment S produced by the pressure of the finger P against the end of the arm P' projecting from the rock-shaft $i$, to which the segment is secured. This pressure of the finger P is produced automatically by means of a powerful spring, $f$, operating to draw the shaft O' inward. The shaft $i$ carries the lever Q, which by its downward movement operates to move the train of adding-wheels R of an approved form, and this downward movement is produced and the rod S' simultaneously carried upward by the action of the spring $e$ when the arm P' is relieved from the pressure of the finger P and tension of the spring $f$.

Proportional stops or pins K K K, one for each receptacle, are fitted on the face of the wheel, in position so that the bar S' shall come into contact therewith, and the length of each stop is adjusted in proportion to the denomination of the check in the corresponding receptacle, so as to permit an extended movement of the bar and consequently of the lever Q and of the adding device when a check of a high denomination is delivered, and a proportionately short movement for a check of a low denomination, the movements being adjusted with mathematical accuracy, so that the denomination or exact amount of each check delivered shall be recorded and added by the adding device to the sum already registered thereby. It is evident that the interposed rack S and bar S' may be dispensed with, and the movements of the lever Q be limited by an arm adapted to strike the stops K K.

In the operation of the device shown in Fig. 3 the indicator-hand $a$ is turned to the figure on the index-scale $b$ corresponding to the denomination of the check required, by means of the handle $d$ on end of the shaft O', to which the indicator is attached. The rotation of the shaft will operate, by means of the bevel-gear, to produce a rotation of the carrier M, and to bring thereby the receptacle L, containing the checks of said denomination, over the slide N. The shaft O' is then pulled outward longitudinally, and its outward movement, by withdrawing the finger P from the arm P' of the rock-shaft $i$ on which the segment S is fixed, will allow the spring $e$ to draw down the lever Q and thereby actuate the adding mechanism arranged to be operated by its downward movement. The extent of the movement of the adding-lever Q is limited by the contact of the sliding rod S' with the stop K, brought into register therewith by the movement of the carrier M, said movement being greater or less in proportion to the denomination of the check. The outward movement of the shaft O' produces an extension of the spiral spring $f$, which is powerful enough, when the shaft is released, to draw it back, and also to draw up the arm Q and to extend thereby its operative spring, $e$, this return movement of the arm Q being produced by the pressure of the finger P upon the arm P'.

Instead of making the proportional stops or contact-points which serve to limit the movement of the adding device in accordance with the position of the indicator to project more or less from the face of a wheel to and from which the stop-bar is made to reciprocate in a line at right angles thereto, we contemplate, as an equivalent therefor, causing the stops to approach more or less closely a center about which they revolve, and to and from which the stop-bar is made to reciprocate radially.

This form of our device is exemplified in Fig. 4 of the drawings, in which T represents an indicator-lever pivoted centrally and whose outer arm, fitted with a suitable handle, $t$, is made to vibrate over the face of an index-plate, U. The inner arm of the lever terminates in a segmental rack engaging the teeth of a sliding bar, T', which is also adapted to engage a toothed segment, $T^2$, geared to a type-wheel, $T^3$. The type-wheel and the indicator-lever are so arranged with reference one to the other and to the intermediate gearing as that the particular type on the wheel corresponding to the number on the index-plate to which the outer arm of the lever is carried shall be brought by this movement of the lever into register with an imprinting platen or plate, V. This platen is brought against the type by means of a pivoted lever, V', actuated by a second lever, W, as illustrated in Fig. 4. A downward pressure upon this lever W will operate to cause the printing-platen to bear up against the type, and thereby print the number upon an interposed check or strip. The downward movement of the lever W is made by means of a pawl, W', pivoted upon a sliding bar, $W^2$, to engage ratchet-teeth formed upon a pinion, $W^3$, to actuate an adding device, $W^4$, of any approved description. This movement of the bar $W^2$ is arrested and limited by the contact of its lower end with a cam or eccentric surface, Y, rotating with or made a part of the gear-wheel $T^2$, so that as the wheel $T^2$ is rotated more or less, according to the movement of the indicator-lever T, to bring the type of a greater or a less denomination on the wheel $T^3$ into register with the printing-platen V, a point of contact more or less removed from the axis of the wheel shall be presented to the radial bar $W^2$, so as to limit more or less its stroke or movement, and consequently the movement of the adding devices $W^4$ actuated thereby. The eccentric surface or cam Y is so proportioned and disposed with reference to the toothed wheel $T^2$, the rack-bar T', indicator-lever T, and type-wheel $T^3$, geared to and actuated by the wheel $T^2$, as that when the type for the check of highest denomination is brought into position for printing, the bar $W^2$ shall have sufficient play to allow its movement to move the adding mechanism forward such a distance as will cause it to register and add to the sum already recorded a number corresponding to the denomination to be printed, and in like manner the presentation of a type of any denomination to the platen will bring such a contact-point upon the cam into line with the bar $W^2$ as that its movement will be so limited as to produce the exact movement of the adding mechanism required to register and add the number or amount of said particular denomination. Sufficient play is permitted to the lever W to allow it at all times to operate the platen V, irrespective of the position of the sliding bar W², by providing for an independent play of the bar, the extent of motion being taken up, when not required, by a spring, c.

We have made the mechanism described as above for printing or delivering checks of various denominations the subject of separate applications for Letters Patent, now pending, and herein

We claim as our invention—

1. The combination, with a wheel or carrier, an indicator denoting the position of the same, a scale of numbers employed in connection with said indicator, and a suitable adding mechanism, of a series of separate or connected stops formed upon or moving in unison with said wheel or carrier and adapted severally to limit, more or less, in proportion to their distance from a common initial plane or center, the effective movement of the adding mechanism, the distance of the several stops from said common plane or center being defined each by a measure of length whose value is indicated by one of the numbers upon the indicating-scale.

2. In a check-machine, the combination, with an indicating device, and with mechanism for delivering checks of different denominations and which moves synchronically with the indicating device, whereby the denomination of each check issued shall correspond with the figures denoted at that moment by the indicator, of mechanism for registering automatically the sum of the denomination of the last check added to the sum of the checks previously issued from the machine, substantially in the manner and for the purpose herein set forth.

3. In a check-machine, the combination, with a device for issuing checks of different denominations, mechanism for actuating said device and for indicating the position thereof required for the delivery of a check of any given denomination, a device for registering at each complete movement of the check-delivering device the sum of the units represented by the check issued by said movement added to that of the checks previously issued, and mechanism for communicating the movement of the check-delivering device to the registering device, of a series of stops or stop-surfaces moving synchronically with the indicating mechanism, each of which is made to approach or depart from a common initial plane or point to a degree which shall correspond proportionately to the difference between the denomination denoted at the moment by the indicating mechanism and the unit of said denomination, and which operates to govern the mechanism by which the movement of the check-delivering device is imparted to the registering device, substantially in the manner and for the purpose herein set forth.

In testimony whereof we have signed our names to this specification in the presence of two subscribing witnesses.

CHARLES W. WEISS.
CHAS. KRUSE.

Witnesses:
J. F. ACKER,
A. P. MOORE.